United States Patent
Kuehn (10) Patent No.: US 12,259,034 B2
(45) Date of Patent: Mar. 25, 2025

(54) METHOD FOR MONITORING A GEARBOX DRIVEN BY AN ELECTRIC MOTOR

(71) Applicant: LENZE SE, Aerzen (DE)

(72) Inventor: Johannes Kuehn, Braunschweig (DE)

(73) Assignee: Lenze SE, Aerzen (DE)

( * ) Notice: Subject to any disclaimer, the term of this patent is extended or adjusted under 35 U.S.C. 154(b) by 882 days.

(21) Appl. No.: 17/422,229

(22) PCT Filed: Jan. 15, 2020

(86) PCT No.: PCT/DE2020/100027
§ 371 (c)(1),
(2) Date: Feb. 18, 2022

(87) PCT Pub. No.: WO2020/147893
PCT Pub. Date: Jul. 23, 2020

(65) Prior Publication Data
US 2022/0205525 A1    Jun. 30, 2022

(30) Foreign Application Priority Data
Jan. 15, 2019 (DE) .......................... 102019100941.3

(51) Int. Cl.
*F16H 57/01* (2012.01)
*B60L 15/20* (2006.01)
*G01M 13/021* (2019.01)
*F16H 57/00* (2012.01)

(52) U.S. Cl.
CPC ............ *F16H 57/01* (2013.01); *B60L 15/20* (2013.01); *G01M 13/021* (2013.01); *F16H 2057/0081* (2013.01); *F16H 2057/012* (2013.01); *F16H 2057/016* (2013.01); *F16H 2057/018* (2013.01)

(58) Field of Classification Search
CPC ............ F16H 57/01; F16H 2057/0081; F16H 2057/012; F16H 2057/016; F16H 2057/018; B60L 15/20; G01M 13/021; G01M 13/02; Y02T 10/72
See application file for complete search history.

(56) References Cited

U.S. PATENT DOCUMENTS

| 9,915,337 B2 | 3/2018 | Arita et al. | |
| 2007/0183282 A1* | 8/2007 | Oyabu | H02P 6/06 369/47.25 |
| 2008/0179886 A1 | 7/2008 | Rebsdorf | |

(Continued)

FOREIGN PATENT DOCUMENTS

| CN | 101660603 A | 3/2010 |
| CN | 105276163 A | 1/2016 |

(Continued)

OTHER PUBLICATIONS

Chinese Office Action, Dated Nov. 17, 2023.

*Primary Examiner* — Michael V Kerrigan
(74) *Attorney, Agent, or Firm* — Muirhead and Saturnelli, LLC (57) ABSTRACT

The invention relates to a method for monitoring a transmission driven by an electric motor with a motor control, in which load changes with zero crossing of the motor torque in the transmission are monitored, wherein at least one operating parameter of the electric motor and/or the motor control is measured and evaluated for monitoring the load change.

13 Claims, 4 Drawing Sheets

(56) References Cited

U.S. PATENT DOCUMENTS

| | | | |
|---|---|---|---|
| 2009/0165570 A1* | 7/2009 | Bellm | F16H 57/12 |
| | | | 73/862.194 |
| 2011/0022234 A1 | 1/2011 | Meyer et al. | |
| 2014/0130625 A1 | 5/2014 | Dewitz | |
| 2016/0325639 A1* | 11/2016 | Kadynski | G05B 19/4062 |
| 2017/0152921 A1 | 6/2017 | Ikemura et al. | |
| 2021/0086622 A1 | 3/2021 | Zhang et al. | |

FOREIGN PATENT DOCUMENTS

| | | |
|---|---|---|
| CN | 107023614 A | 8/2017 |
| DE | 43 16 817 A1 | 11/1994 |
| DE | 697 07 685 T2 | 8/2002 |
| DE | 11 2006 003 147 T5 | 10/2008 |
| DE | 20 2010 017 605 U1 | 11/2012 |
| DE | 10 2011 108 013 A1 | 1/2013 |
| DE | 10 2015 208 517 A1 | 11/2016 |
| DE | 10 2016 212 197 A1 | 1/2018 |
| EP | 0 915 795 B1 | 10/2001 |
| EP | 2 952 869 A1 | 12/2015 |
| JP | 10332539 A | 12/1998 |
| WO | WO 1998/005544 A1 | 2/1998 |
| WO | WO 2007/000449 A1 | 1/2007 |
| WO | WO 2007/072937 A1 | 6/2007 |
| WO | WO 2007/131819 A1 | 11/2007 |
| WO | WO 2018/227885 A1 | 12/2018 |

\* cited by examiner

METHOD FOR MONITORING A GEARBOX DRIVEN BY AN ELECTRIC MOTOR

TECHNICAL FIELD

The system described herein relates to monitoring a transmission driven by an electric motor with motor control.

BACKGROUND

Electric motors with gear units are particularly used in the industrial environment for a wide range of applications. Such combinations of motor, gear unit, and motor control are referred to herein as "drives". Such drives often perform tasks that are essential for the respective industrial process in which the drives are integrated. This means that in the event of a failure of the drive, not only the costs for the repair and/or replacement of the drive itself are incurred, but also further—and much greater—damage can occur for the operators of the drives. This can be the case in particular if production is lost due to the drive failure.

In the past, methods have therefore been developed for the design of corresponding drives, which are intended to ensure that premature drive failure does not occur, i.e. in particular that the drive fails before a scheduled service life of the drive.

In addition, methods exist according to which the operating parameters of such drives are monitored in order to warn early enough of possible increased wear and tear in the respective application and any resulting premature failure of the drive. The monitored operating parameters can be, for example, speeds, torques, and/or operating times.

However, premature drive failure can still occur in practice.

SUMMARY OF THE INVENTION

The system described herein is based on monitoring a transmission driven by an electric motor with motor control, which reduces the risk of premature failure of the drive and/or enables a mode of operation that is more gentle on the transmission.

According to the system described herein, load changes with zero crossing of the torque are monitored. Here, at least one operating parameter of the electric motor and/or the motor controller is measured and/or evaluated to monitor the load changes.

The system described herein is based on the knowledge that zero-crossing load changes, i.e. load changes in which the direction of the torque exerted by the drive on the transmission changes, can contribute to wear of the transmission to a particular extent. The gearbox can be a toothed gearbox in particular.

This concerns in particular the case when the gearbox has a so-called slackness. This refers in particular to gear backlash that causes the tooth flanks in the gearbox to lose contact with each other for a short time during the load change when the direction of the torque exerted by the engine on the gearbox changes. Only when the tooth flanks reengage with each other does the gearbox transmit the torque back to the equipment driven by the gearbox. This results in the motor having to cope with a much lower load for a short time at the moment of the load change than during operation before and after the load change, for which the regulation or control of the motor is usually designed. During the short time, the motor only has to move parts of itself. This can cause the tooth flanks to build up a certain relative speed to each other while the tooth flanks are out of mesh, and as a result, when the tooth flanks re-engage with each other, the tooth flanks hit each other with some force. This leads to wear of the tooth flanks, which in turn contributes to a further increase in gear backlash or slack.

However, such increased wear during load changes can also occur in gear units without gear backlash, such as preloaded gear units, in particular preloaded planetary gear units. In such gear units, the tooth flanks cannot become disengaged. Nevertheless, increased stresses on the gearbox occur during load changes with a zero crossing of the torque of the motor. In these cases, the load change leads to increased pressure between the surfaces of the tooth flanks, which also leads to increased wear and thus to premature aging of the gear unit.

The system described herein can provide that the monitoring of the load changes is used to detect and, in particular, signal critical operating states. This makes it possible, for example, to detect during commissioning if a gear unit will be subjected to greater stress by load changes in subsequent operation than the design of the gear unit allows. For example, an optical and/or acoustic signal can be output when critical operating conditions occur. In such a case, a more gear-protecting mode of operation can then be brought about, for example, by changing control parameters, in particular control parameters of the engine control system. However, critical operating states can be signaled not only during commissioning, but also during subsequent operation. This is particularly useful in applications where the movements to be performed by the drives vary greatly during operation. This can be the case, for example, with manually controlled drives. In such cases, signaling of critical operating states warns the operating personnel so that they can influence the mode of operation of the drives with a view to protecting the gear unit during load changes.

Alternatively and/or additionally, the monitoring of the load changes can be used to log the load and/or wear of the transmission. This can be done in particular by storing data obtained during the measurement of at least one operating parameter of the electric motor and evaluation of the at least one operating parameter. The resulting data allows conclusions to be drawn about the type and/or extent of the load and/or wear of the gear unit. In this way, a retrospective fault analysis is made possible. In particular, the data can be stored in a so-called electronic logbook. The data obtained in this way can also be evaluated for use in the design of drives. Maintenance and/or repair work can also be supported by the data, for example by responding to increased wear in good time as part of a scheduled maintenance interval before the drive fails during operation.

Alternatively, and/or in addition, the monitoring can be used to trigger an automated operational intervention. The automated operational intervention could be an emergency shutdown. Such an emergency shutdown can ultimately prevent the occurrence of consequential damage in particular. It is also possible that the automated operating intervention initially provides for an adaptation of the operating mode, for example by actuating drives with lower speed or torque gradients at the time of the load change. In other words, this means that a type of saving operation is triggered depending on the monitoring of the load change.

The operating parameter of the electric motor or the motor control unit that is measured can be the torque, the motor position, the speed, the voltage, the current and/or the power. The measurement of the operating parameter in the area of the electric motor and/or the motor control has the advantage that in the area of the motor control and/or the electric motor—in contrast to the area of the transmission—a certain metrological infrastructure is already available. As a rule, at least one suitable voltage supply and/or cabling is available. As a rule, the electric motor and/or motor control also already have the sensor technology required for measuring the operating parameter, since the sensor technology is available for control purposes, for example.

In particular, the time-dependent progressions of the aforementioned operating parameters can be evaluated with regard to the gear backlash. For example, when monitoring the motor position, the position error can be determined, i.e. the deviation of the real motor position from the motor position that would result from an ideal, i.e. ideally stiff and without any backlash, drive section. If there are changes in the direction of rotation of the motor and the gear unit has a gear backlash, this results in characteristic jump points in the course of the position error.

Alternatively and/or additionally, for example, the time-dependent course of torque and motor position can be measured and evaluated as a function of each other. Immediately after the reversal of the direction of rotation of the motor during the load change, the torque will initially be low due to the gear backlash and will rise sharply at the moment when the tooth flanks engage with each other. Conclusions about the gear backlash can also be drawn from the angle from which the motor has rotated before the steep torque rise sets in.

In particular, it is possible that the number of load cycles is monitored. The number of load cycles can serve as a measure of the mechanical load on the transmission. This can be an advantageous design of the method, in particular, if the load changes differ from each other only to a small extent in terms of the mechanical load on the transmission resulting from the load changes. In particular, exceeding a predetermined number of load cycles can be detected as a critical operating state. The detected critical operating state can be signaled.

The frequency of the load changes can be monitored. The frequency of the load changes can be the instantaneous frequency of the load changes, which can be calculated, for example, from the time intervals to the respective following load change. Alternatively and/or supplementarily, a frequency averaged over a certain period of time can be considered. An averaged frequency can also be determined, for example, by recording and monitoring the number of load changes over a certain period of time as the frequency of the load changes. A higher frequency of load changes correspondingly entails a higher mechanical load on the gearbox. Exceeding a specified frequency can be detected and signaled as a critical operating condition.

Furthermore, the gear backlash can be monitored. The gear backlash can be regarded as a measure of the existing wear of the engine. Accordingly, exceeding a predefined gear backlash can be detected and signaled as a critical operating condition.

In this context, it is particularly advantageous if the gear backlash is monitored as described elsewhere herein by monitoring the time-dependent characteristics of the motor torque as a function of the time-dependent characteristics of the motor position. Likewise, it is possible that the time-dependent torque gradient is monitored at the time of the zero crossing of the torque. If a predefined torque gradient is exceeded, this can be detected and signaled as a critical operating state.

The motor position can be determined by means of a rotary encoder, for example. This is particularly advantageous if the motor—as is often the case—is equipped with a rotary encoder anyway. The torque can advantageously be obtained from the electrical operating parameters of the motor—in particular voltage and/or current. In this way, the determination of the operating parameters used for monitoring the load changes is possible in a comparatively simple manner.

Furthermore, a characteristic value for the load and/or the wear of the gearbox can be determined from the result of monitoring the number of load changes, the load change frequency, the gear backlash and/or the torque gradient. Such a characteristic value can take into account different factors for the wear of the gearbox, so that overall a more accurate measure of the wear of the gearbox is obtained than is the case when monitoring only one of the factors relevant to wear. Exceeding a specified value by the characteristic value can be detected and signaled as a critical operating condition.

An energy balance can be used when determining the characteristic value for the load and/or wear of the gearbox. Thus, for a "shock" that occurs in a gearbox during a load change, the difference between the kinetic energy in the system before and after the shock can be calculated. The difference can serve—at least as a good approximation—as a measure of the energy expended for plastic material deformations during the shock.

The electric motor can be controlled by a converter. Operating parameters such as voltage and/or current can then be measured at the converter. Modern converters for controlling electric motors also have the corresponding control and/or regulating electronics, which can thus be integrated into the implementation of the described process.

The method can provide that at least one operating parameter is evaluated taking into account the area of a transmission element affected by a respective load change. This is particularly useful whenever the load changes occur with a statistical accumulation whenever the elements of the transmission are in a certain position relative to one another. Elements of the transmission, such as gears, are then statistically clustered in certain areas in engagement with each other. The certain areas are then subject to greater wear than other areas of the affected transmission elements.

It can therefore be useful to detect angular positions of individual gear elements and/or the motor. At least one operating parameter can then be evaluated as a function of the position or of recorded positions. This makes it possible to identify the areas of the respective transmission elements affected by increased wear due to the load changes.

The gear elements may be gears. Ideally, it is then possible to identify the individual teeth that are affected by a respective load change. For this purpose, in particular the angular position of the motor shaft and/or the angular position of a shaft of the gearbox can be detected. At least one operating parameter can then be evaluated as a function of the respective tooth affected. This makes it possible, in particular, to better estimate the service life of a gearbox if the gearbox is involved in performing repetitive motion patterns with frequent load changes.

The latter can be the case in particular if the gear unit is a component of an industrial robot. In applications in industrial robots, the drives rarely complete entire revolutions. Instead, the drives often rotate only unlimited angular ranges. This also applies in the field of automation technology. Here, too, there are a large number of drive tasks in which the drives repeatedly perform the same movements and, in relation to the total distance covered, perform a high number of load changes.

In all the applications discussed herein, if the same teeth of a gearbox are repeatedly affected by the load changes, wear will occur much more rapidly than in a gearbox in which the stress on the teeth due to load changes is distributed randomly and thus uniformly over all the teeth. Therefore, an evaluation taking into account the areas of gear elements affected by a respective load change is advantageous especially in such applications.

BRIEF DESCRIPTION OF THE DRAWINGS

Further practical embodiments and advantages of the system described herein are described below in connection with the drawings. It is shown in.

DESCRIPTION OF VARIOUS EMBODIMENTS

Figure 1:
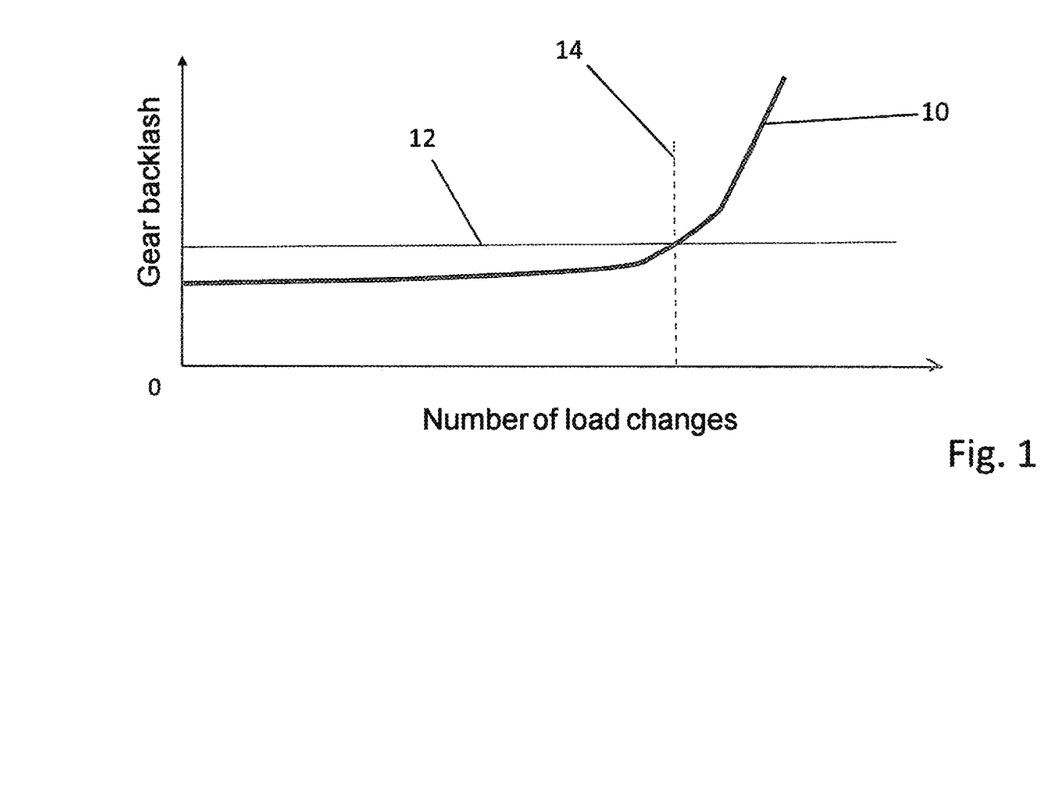
FIG. 1 shows the gear backlash as a function of the number of load cycles.

FIG. 1 shows an example of the development of the gear backlash 10 as a function of the number of load changes. The development of the gear backlash 10 typically shows an—at least essentially—exponential behavior. The gear backlash 10 remains largely constant over most of the service life of a gearbox. Towards the end of the service life of a gearbox, however, there is a steep increase in gearbox backlash 10. This is because as gearbox backlash 10 increases, so does the load on the gearbox due to load changes, and hence the resulting damage to the gearbox. The result is a self-reinforcing process that ultimately leads to the destruction of the gear unit.

In practice, therefore, it makes sense to know the point in time at which the comparatively steep increase in gear backlash 10 and thus the increasingly rapid destruction of the gearbox begins. Since it is advantageous in practice not to let it get to the point of destruction of the gear unit, but rather to arrange for scheduled maintenance or scheduled replacement of the gear unit at an earlier point in time, this offers the possibility of defining the exceeding of a certain, maximum permissible gear unit backlash 10 as the end of the service life 14 of the gear unit.

In a particularly advantageous way, the knowledge gained with the method according to the system described herein about the dependence of the service life of the transmission on the load changes can be used to design future drives. Software solutions in particular can be used for this purpose. Data obtained with the method according to the system described herein, in particular on the influence of the load changes on the service life of the transmission, can thus be used to improve the planning of future drives.

Figure 2:
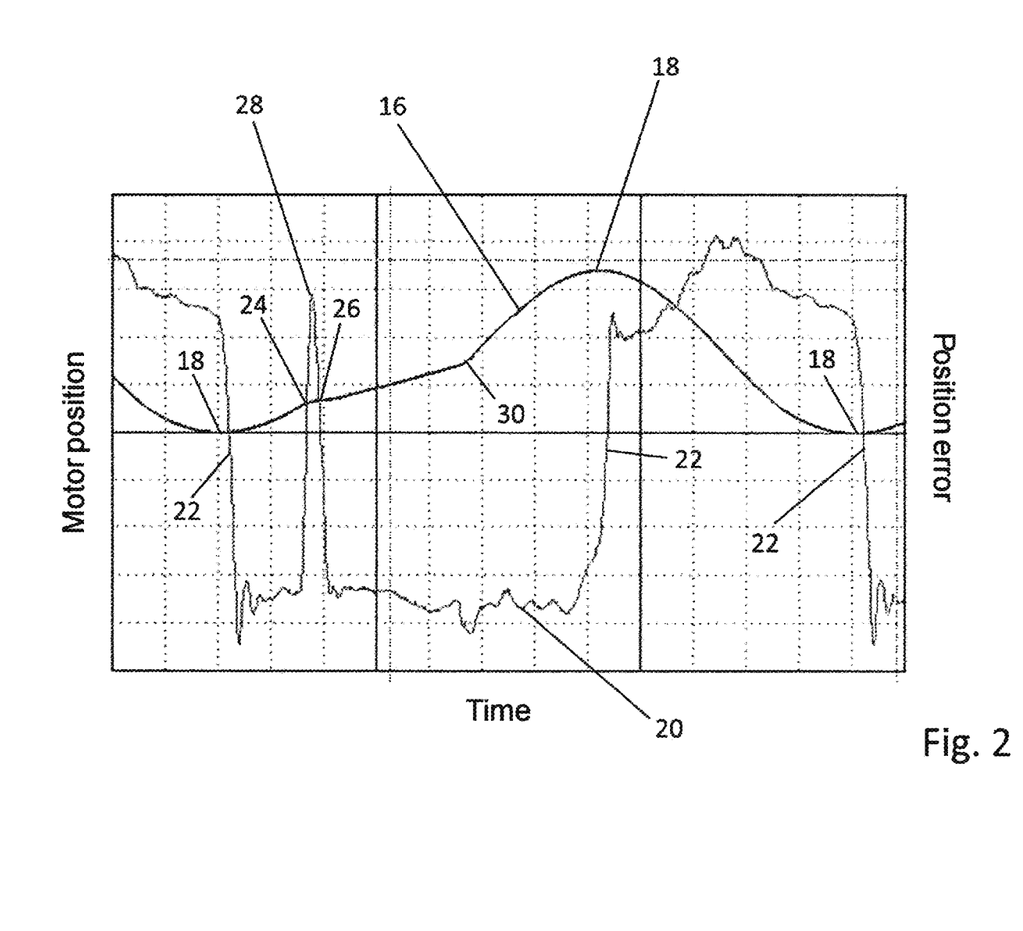
FIG. 2 shows an example of the motor position and the position error resulting from the gear backlash.

FIG. 2 shows how the motor position 16 and the position error 20 resulting from the gear backlash 10 behave as a function of time. In the example shown, the time characteristic of the motor position 16 has three reversal points 18 of the direction of movement of the motor. The reversal points 18 are represented by maxima in the course of the motor position 16.

The course of the position error 20 as a function of time shows regular jump points 22 at the reversal points 18. The jump points 22 result from the gear backlash 10 when the tooth flanks briefly disengage at the moment of zero passage of the torque of the electric motor and then strike against each other again. The "height" of the jump points 22 represents the gear backlash 10.

Further load changes with zero crossing of the motor torque occur at transitions 24 between driving and braking operation of the motor without changing the direction of rotation of the motor. At the transition 24 shown as an example, a short "intermediate braking" takes place via the motor. As a result, the tooth flanks are disengaged for a short time due to the inertia of the gear unit until the braking effect of the motor sets in. In the example shown, the short braking is immediately followed by another load change, during which a transition 26 takes place from the braking mode of operation of the motor to a driving mode. As a result, a peak 28 of the position error 20 is formed between the transitions 24 and 26.

Peak 28, which results from a short "intermediate deceleration", is-strictly speaking-two jump points 22 immediately following one another, as they also occur at the reversal points 18. Since the present case involves a very short intermediate deceleration which is immediately followed by a drive phase again, the two jump points 22 show the shape of the peak 28. If the deceleration phase between the transitions 24 and 26 were to continue for a longer time, two jump points 22 would be formed in the course of the position error 20 instead of the peak 28.

The scenario is different if the movement of the motor only experiences an acceleration 30 in the direction of movement of the motor. In this case, there is a sharp increase in torque, but the torque curve does not undergo a zero crossing, i.e. there is no load change. Accordingly, there is also no jump point 22 in the course of the position error 20.

Figure 3:
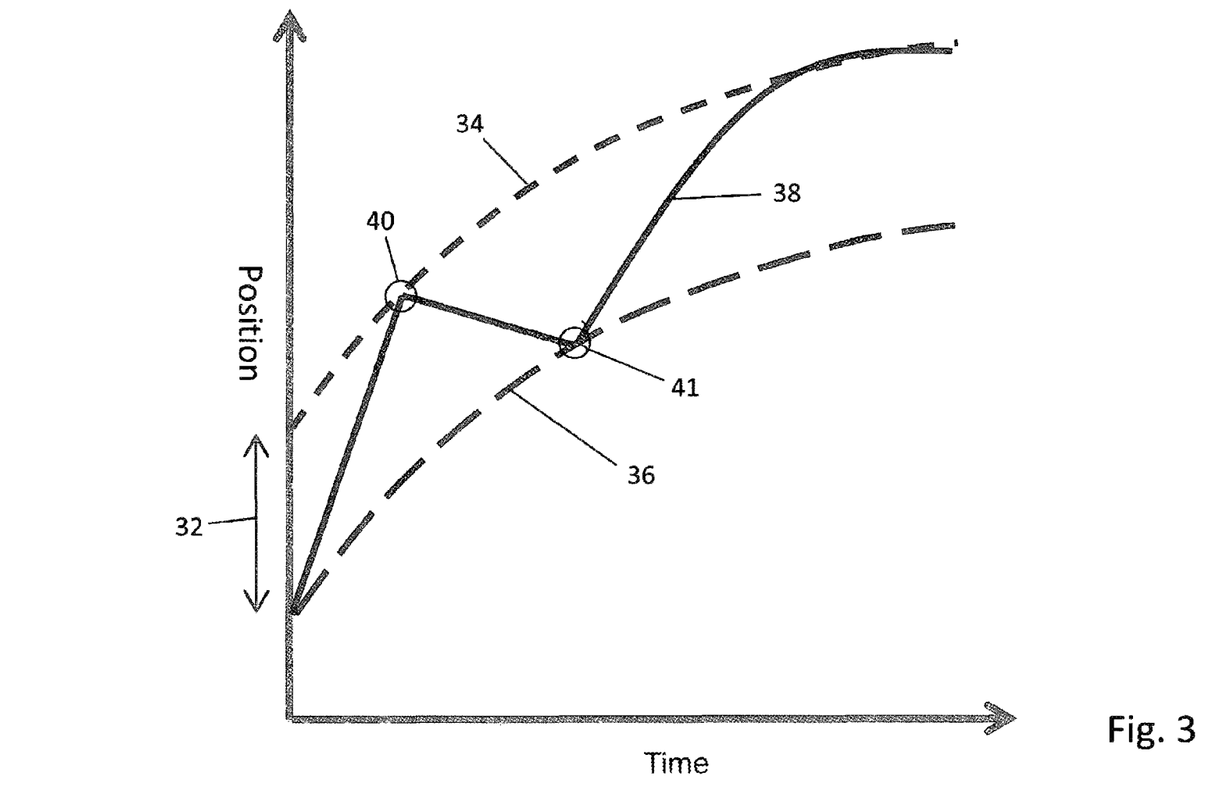
FIG. 3 shows an example of the load position during a braking process.

FIG. 3 shows an example of how the position of the load behaves due to an existing gear backlash. The gear backlash 32 corresponds to the difference between a maximum position 34 and a minimum position 36. The load moved by the drive can assume a position between the maximum position 34 specified by the motor position and the minimum position 36 also specified by the motor position. Both in the case of the maximum position 34 and in the case of the minimum position, tooth flanks of the gearbox are in contact with each other.

The motion sequence shown as an example in FIG. 3 shows a load change in the form of the deceleration of a load, which initially moves at a constant initial speed, by the motor. Accordingly, the load position 38 at time zero is equal to the minimum position 36. This means that the tooth flanks are adjacent to each other in such a way that a force driving the load in the positive direction of movement could be transmitted to the load, but not a deceleration end.

Deceleration results in a flatter curve of the maximum position 34 specified by the motor position and the minimum position 36 specified by the motor compared to the curve of the load position 38, which is steeper due to the initial speed of the initially still unbraked load. The tooth flanks initially disengage until the load position 38 reaches the maximum position 34. At a point of impact 40, the tooth flanks collide with each other.

Due to the elastic component of the impact, the direction of movement of the load is reversed until the load position 38 at the impact point 41 again corresponds to the minimum position 36. The tooth flanks collide again and the direction of movement of the load is reversed again.

In the further course of the movement, the load position 38 again reaches the maximum position 34. Due to the kinetic energy already partially dissipated by the previous impacts, the tooth flanks come into contact in the further course of the movement in such a way that a braking force can be transmitted to the load via the tooth flanks. The load position 38 then corresponds to the maximum position 34. The further braking of the load can now take place without further impacts.

Figure 4:
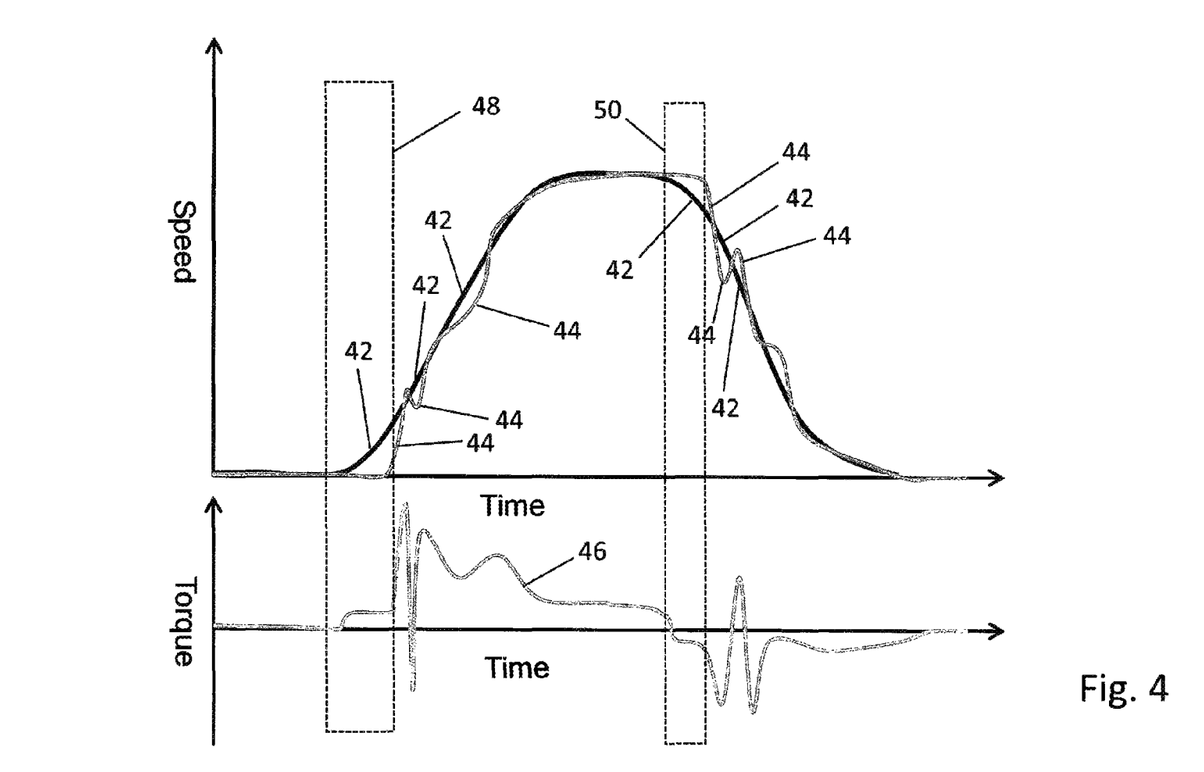
FIG. 4 shows an example of the motor position, load position and motor torque during two load changes.

FIG. 4 shows an exemplary curve of the motor speed 42 of a motor and the load speed 44 of a driven load. The second diagram in FIG. 4 shows the corresponding curve of the motor torque 46. The time axes of both diagrams are identical.

In the example shown, a first load change 48 takes place when the engine is accelerated from a rest position. Here, the motor torque 46 initially increases only slightly when the motor speed 42 begins to rise. In the example shown, tooth flanks are not initially in contact with each other, so the load speed 44 initially remains at zero. Only when the tooth flanks come into contact with each other does the load speed 44 of the load begin to increase abruptly. The torque also increases abruptly.

The impact of the tooth flanks against each other and a corresponding elastic component accelerates the load to such an extent that the tooth flanks initially disengage again. The load speed 44 "overtakes" the motor speed 42 for a short moment until the tooth flanks collide in a further impact. This initially lowers the load speed 44 and consequently brakes the load, causing the motor torque 46 to change abruptly and even assume negative values for the moment of impact of the tooth flanks.

Due to the further acceleration of the motor and the increase in motor speed 42, however, the tooth flanks come into engagement with each other again shortly afterwards, this time in such a way that the load is accelerated and the load speed 44 begins to increase again. The motor torque 46 rises abruptly again accordingly. As the process continues, the motor speed 42 and the load speed 44 converge.

In the further course, a further load change 50 takes place, during which a deceleration of the load is initiated by the motor. Accordingly, a slight negative motor torque 46 is initially generated, which leads to a decrease in motor speed 42. Due to the inertia, even in the case of the load change 50, the load speed 44 initially remains constant until the tooth flanks engage with each other. Initially, the tooth flanks engage with each other in such a way that they can transmit a load braking force from the motor to the load. Accordingly, the load speed 44 begins to decrease rapidly, and the motor torque 46 increases in magnitude toward higher negative values, forming a negative torque peak.

Due to the elastic component of the impact of the tooth flanks against each other, the load is initially decelerated abruptly to such an extent that the load speed 44 falls below the value of the motor speed 42. At this point, the tooth flanks again first disengage from each other and then collide with each other in an orientation in which the motor, which at this moment has a higher motor speed 42 than the load speed 44, again exerts an accelerating effect on the load. Accordingly, there is a positive torque peak of the motor torque 46, and the load speed 44 initially again assumes a slightly higher value than the motor speed 42 due to the elastic component of the impact.

The tooth flanks separate from each other again due to the elastic component of the impact, and then engage with each other with reversed orientation, i.e. so that the motor can exert a decelerating effect on the load. Accordingly, a further negative torque peak is initially formed. In this example, however, so much kinetic energy has already been dissipated by the previous impacts that there is no renewed torque reversal, i.e. no renewed meshing of the tooth flanks in "reverse orientation". Rather, the load speed 44 equalizes to the motor speed 42 in the course of the further course of movement. The torque peaks, which can be clearly seen in the course of the motor torque 46 in FIG. 4, are well suited for identifying and evaluating critical load changes when evaluating the course of the motor torque 46.

The features of the system described herein disclosed in the present description, in the drawings as well as in the claims may be essential, both individually and in any combination, for the realization of the system described herein in its various embodiments. The invention is not limited to the embodiments described. It may be varied within the scope of the claims and with due regard to the knowledge of the person skilled in the art.

The invention claimed is:

1. A method for monitoring a transmission driven by an electric motor with a motor control, comprising:
    monitoring load changes with zero crossing of motor torque in the transmission by measuring and evaluating at least one operating parameter of the electric motor and/or of a controller of the electric motor, wherein a number of load cycles exceeding a predetermined number of load cycles is detected as a critical operating state.

2. The method according to claim 1, further comprising:
    signaling critical operating states to log a load and/or a wear of the transmission and/or to trigger an automated operating intervention.

3. The method according to claim 2, wherein the automated operating intervention is an emergency shutdown.

4. The method according to claim 3, wherein the at least one operating parameter is one or more of: torque, motor position, speed, voltage, current, or power.

5. The method according to claim 1, wherein a number of load cycles is monitored.

6. The method according to claim 5, wherein a characteristic value for a load and/or wear of the transmission is determined based on monitoring the number of load cycles, a load cycle frequency, transmission backlash and/or a torque gradient and wherein the characteristic value exceeding a predetermined value is signaled as a critical operating state.

7. The method according to claim 1, wherein gear backlash is monitored and exceeding a predetermined gear backlash is detected and signaled as a critical operating state.

8. The method according to claim 1, further comprising:
    monitoring transmission backlash as a function of a time-dependent characteristic of the motor torque which is evaluated as a function of a time-dependent characteristic of a motor position.

9. The method according to claim 1, further comprising:
    monitoring a time dependent torque gradient at a time of zero crossing; and
    signaling a critical operating state in response to detecting the time dependent torque gradient exceeding of a predetermined torque gradient.

10. The method according to claim 1, wherein at least one operating parameter is evaluated taking into account an area of a transmission element affected by a respective load change.

11. The method according to claim 10, wherein the at least one operating parameter corresponds to a tooth of a gear of the transmission affected by a respective load change.

12. The method according to claim 1, wherein a test operation is initially carried out within a scope of commissioning and, if critical operating states occur during the test operation, parameters of an open-loop and/or closed-loop control of the electric motor are adjusted.

13. ~~Method~~ A method for monitoring a transmission driven by an electric motor with a motor control, comprising:
   monitoring load changes with zero crossing of the motor torque in the transmission by measuring and evaluating at least one operating parameter of the electric motor and/or of a controller of the electric motor, wherein a frequency of load changes is monitored and exceeding a predetermined frequency is detected and signaled as a critical operating state.

* * * * *

UNITED STATES PATENT AND TRADEMARK OFFICE
CERTIFICATE OF CORRECTION

PATENT NO. : 12,259,034 B2
APPLICATION NO. : 17/422229
DATED : March 25, 2025
INVENTOR(S) : Johannes Kuehn It is certified that error appears in the above-identified patent and that said Letters Patent is hereby corrected as shown below:

In the Claims

Column 8, Line 32:
In Claim 4, the phrase "according to claim 3" should read --according to claim 1--

Column 9, Line 3:
In Claim 13, the phrase "Method A method" should read --A method--

Column 9, Line 6:
In Claim 13, the phrase "zero crossing of the motor" should read --zero crossing of motor--

Signed and Sealed this
Twenty-second Day of July, 2025

Coke Morgan Stewart
*Acting Director of the United States Patent and Trademark Office*